Dec. 1, 1964   E. HEUMAN   3,159,067
CUTTING DEVICE HAVING WORK FEED MEANS
OSCILLATED BY RECIPROCATING DIE
Filed July 18, 1961   2 Sheets-Sheet 2

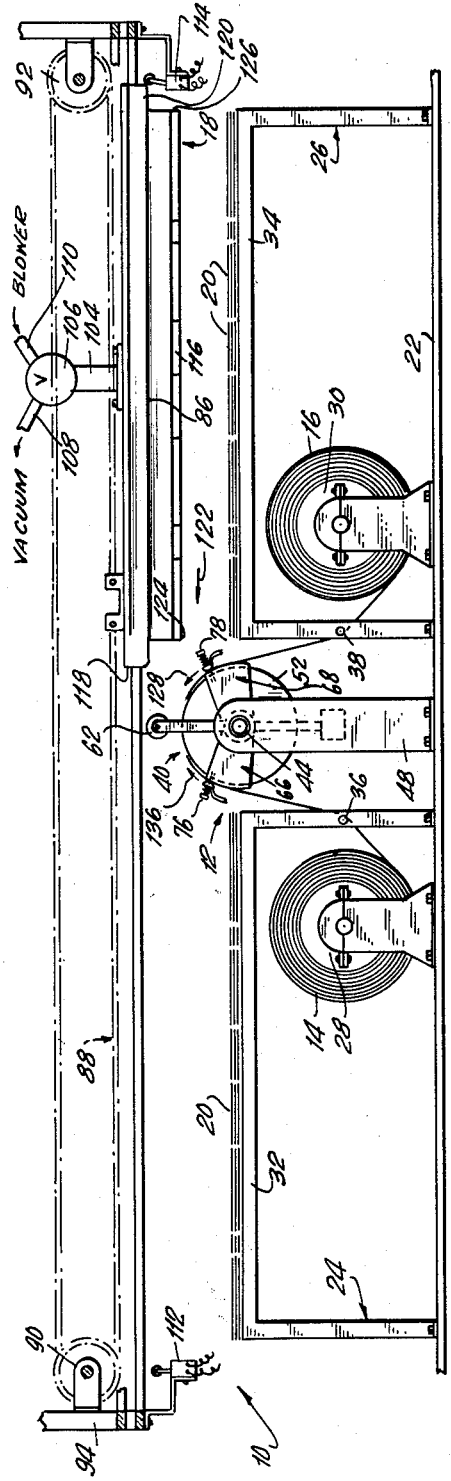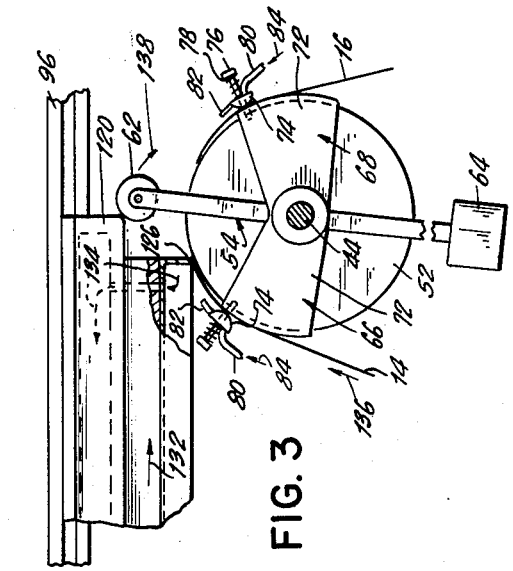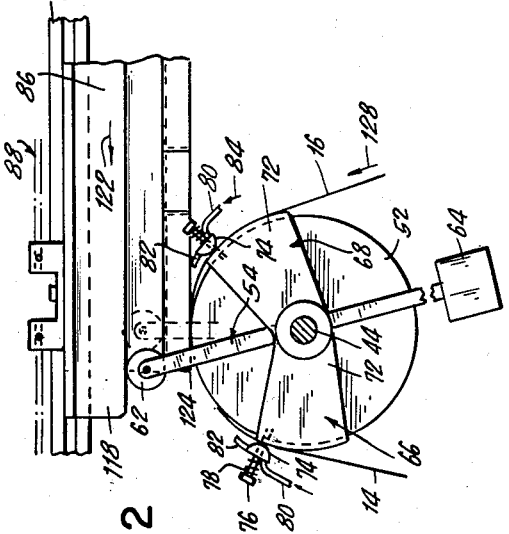

INVENTOR.
ERNEST HEUMAN
BY
Friedman & Goodman
ATTORNEYS

United States Patent Office 3,159,067
Patented Dec. 1, 1964

3,159,067
CUTTING DEVICE HAVING WORK FEED MEANS
OSCILLATED BY RECIPROCATING DIE
Ernest Heuman, 10 Deal Road, West Deal, N.J.
Filed July 18, 1961, Ser. No. 124,832
13 Claims. (Cl. 83—87)

The present invention relates in general to a cutting apparatus and in particular to apparatus for cutting pattern pieces of predetermined shape from sheet material.

It is an object of the present invention to provide a highly novel and efficient cutting apparatus which is especially useful in cutting pattern pieces of various predetermined shapes and design from a roll of fabric sheet material.

It is another object of the present invention to provide a cutting apparatus of the described type wherein the various pattern pieces are each automatically deposited in piles, each of which contains only pieces of the same shape and form.

It is another object of the present invention to provide a cutting apparatus of unusually large cutting capacity which however utilizes only a single cutting die device.

In accordance with the foregoing object, it is still another object of the present invention to provide a cutting apparatus having a reciprocal cutting die device wherein a cutting operation is provided during each reciprocal movement of the die.

It is a further object of the present invention to provide a cutting apparatus which utilizes relatively inexpensive plain steel dies and wherein the dies are carried by a carriage which is relatively of simple construction and relatively inexpensive to manufacture and sell.

It is a still further object of the present invention to provide a cutting apparatus of the described type which obviates the necessity for utilizing a counter die.

It is a still further object of the present invention to provide a cutting apparatus having an automatic feed device for the sheet material which is to be cut and wherein there is no problem insofar as synchronization between the feed mechanism and the cutting mechanism.

Other and further objects and advantages of the present invention will be readily apparent to those skilled in the art from a consideration of the following specification taken in connection with the appended drawings which illustrate the best mode presently contemplated for carrying out the invention.

In the drawings:

FIGURE 1 is a more or less schematic illustration showing a side elevation of a cutting apparatus pursuant to the present invention;

FIGURE 2 is a fragmentary detail of FIGURE 1 on an enlarged scale and illustrates a position through which the mechanism passes during the operation thereof;

FIGURE 3 is a view similar to FIGURE 2 and illustrates another position through which the mechanism passes during the operation thereof;

Figure 4:
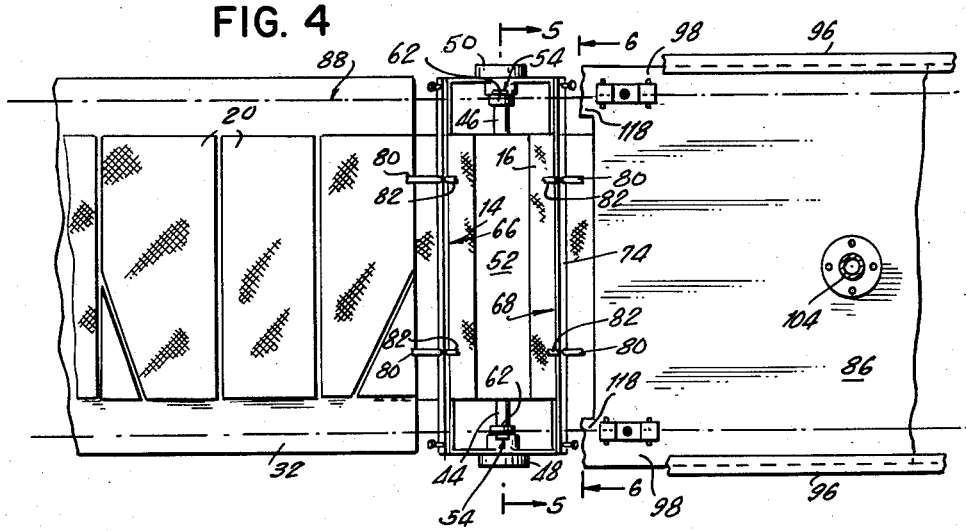
FIGURE 4 is a top plan view of a portion of the apparatus illustrated in FIGURE 1 with parts removed for purposes of illustration.

Referring now to the drawings in detail, there is shown a cutting apparatus 10 pursuant to the present invention. Briefly described, the cutting apparatus 10 comprises an automatic feed mechanism 12 for feeding rolls of sheet material 14 and 16 is opposite directions so as to subject the sheet material from said rolls to the cutting action of a cutter mechanism 18 which is mounted for lateral or horizontal reciprocation, so that during each operating stroke thereof the cutting mechanism 18 cuts the sheet material from one of the rolls 14 and 16 and deposits the cut pieces into individually stacked piles 20, each of which contains pieces of the same shape or conformation.

The automatic feed apparatus 12 comprises a base 22 to which there is secured a pair of laterally related tables 24 and 26. Payout reels 28 and 30 are secured to the base 22 beneath the tops 32 and 34 of the tables 24 and 26 respectively. The fabric sheet material roll 14 is provided on payout reel 28 and the fabric sheet material roll 16 is provided on payout reel 30. The confronting ends of tables 24 and 26 are provided with rollers 36 and 38 respectively under which the web from the associated sheet material roll passes at it is supplied to the automatic feed means 40.

Figure 5:
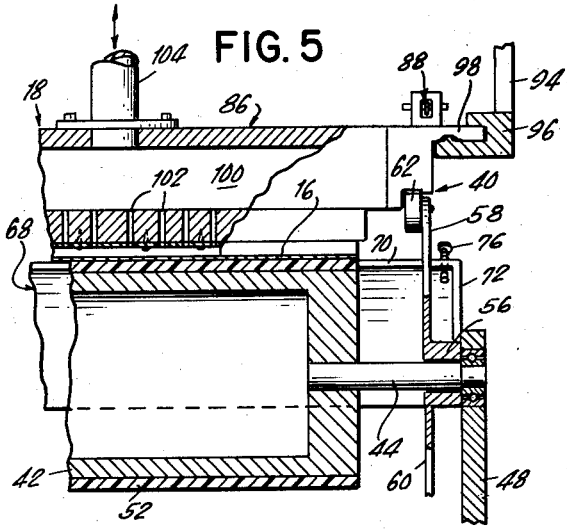
FIGURE 5 is a sectional view on an enlarged scale taken on the line 5—5 of FIGURE 4.
Figure 6:
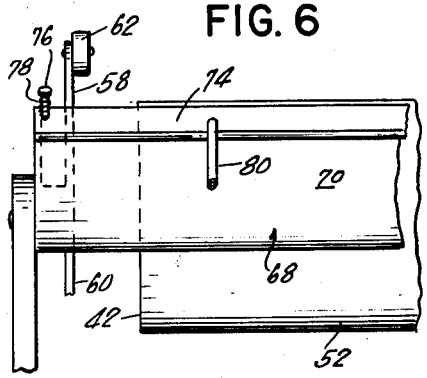
FIGURE 6 is a sectional view on an enlarged scale taken on the line 6—6 of FIGURE 4.

Feed means 40 comprises a cylinder 42 which, as best shown in FIGURE 5, is mounted on shaft members 44 and 46 which are freely rotatable in vertical supports 48 and 50 respectively which are secured to the base support 22. Cylinder 42 is provided with a counter cutting surface 52. Each of the shafts 44 and 46 is provided with a feed actuator member 54. The feed actuator member 54 comprises a central apertured hub 56 which is mounted for relative rotary movement on the associated shaft member and is provided with the oppositely extending integral arms 58 and 60. The upper arm 58 is provided at the free end thereof with a roller 62 and the lower arm 60 is provided at the free end thereof with a counter-weight 64. The automatic feed device 40 also includes a pair of feed segments 66 and 68. Each of the feed segments is provided with an arcuate elongated base 70 which overlies and conforms to the cylindrical cutting surface 52, it being noted from FIGURE 4 that the feed surfaces 70 are circumferentially spaced relative to the cylindrical cutting surface 52. Each of the feed members 66 and 68 is provided with a pair of laterally depending arms 72 which depend from the opposite ends of the associated feed surface 70. A clamping bar 74 overlies each base surface 70 of the feed members 66 and 68, the clamping bar being urged toward the associated base surface 70 by clamping elements 76 provided with springs 78 so as to tension the clamping bar 74 toward the underlying base surface 70. Each clamp bar 74 is provided also with a pair of air conduits or hoses 80 which extend from a suitable source of compressed air and which terminate in nozzles 82 for discharging the compressed air forwardly of the associated clamping bar 74 for a purpose hereinafter described in detail. From the foregoing, it will be apparent that the feed members 66 and 68 and the associated clamp bars 74 carried thereby are free to oscillate about the shaft members 44 and 46 of the cylinder 42 in response to the oscillation or rotary movement of the actuating members 54 about said shaft members whereby to rotate the feed members 66 and 68 relative to the cylinder 42 as shown, for example, in FIGURES 2 and 3. In operation, the end of each of the fabric rolls 14 and 16 is pressed under the associated guide rollers 36 and 38 respectively and over the arcuate surfaces 70 of the associated feed members 66 and 68 respectively being then passed below the clamping bars 74 and onto the exposed cutting surface 52, being retained in releasable engagement therewith by air issuing from air nozzles 82, the air feeding from a suitable supply thereof, as indicated by arrows 84.

The cutter mechanism 18 comprises a carriage 86 mounted for horizontal reciprocation relative to the automatic feed mechanism 12. The carriage is suitably mounted on an endless conveyor belt or chain 88 which is driven by the conveyor or sprocket wheels 90 and 92 suitably mounted on a frame 94 which overlies the automatic feed mechanism. Each wheel is driven by a suitable motor, not shown, which drives the wheels in opposite directions so that one motor causes the carriage to move to the left, viewing FIGURE 1, and the other motor causes it to move to the right viewing said figure. Frame 94 is provided with laterally spaced guide members or rails 96 which receive lateral guide projections 98, provided on carriage 86, as best shown in FIGURE 5. Carriage 86 is provided with a hollow chamber 100 which is enclosed at all sides and is provided in its lower surface with the bores 102 which constitute air passages. An air conduit 104 provided on the upper wall of carriage 86 communicates with the interior of chamber 100, except for the air passages 102 in the bottom surface thereof. An air conduit 104 extends from the interior of the chamber 100 to a valve 106. The valve is connected to a first conduit 108 which extends to a suitable device for effecting evacuation of the air in the chamber 100 and to a conduit 110 which is connected to a blower for blowing air into the chamber 100. The valve is operated under the control of a pair of limit switches 112 and 114 which also controls the operation of the motors for the conveyor wheels 90 and 92 as hereinafter described in detail. Below the air passages 102, the carriage 86 mounts a plurality of steel cutting dies 116. The carriage 86 is provided also with the opposite end projections 118 and 120.

Figure 7:
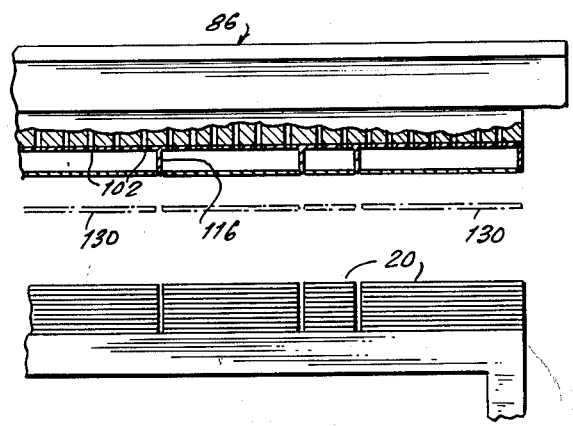
FIGURE 7 is a fragmentary view of a portion of FIGURE 1 on an enlarged scale with parts broken away for purposes of illustration.

FIGURE 1 illustrates the condition of the apparatus 10 at the start of an operating cycle. It will be understood that in said condition of the apparatus the valve 106 is in condition so that the conduit 108 is connected to the chamber 100. Furthermore, the conveyor wheel 90 is operative so as to move the carriage 86 in the direction of the arrow 122 in FIGURE 1 and the motor for the wheel 92 is inoperative. Further, it will be noted that the automatic feed apparatus 40 is in the condition thereof illustrated in FIGURE 1 with the leading end of web 16 threaded beneath the adjacent clamping bar 74 and extending onto the cutting surface 52 of the cylinder 42 as shown in FIGURE 4 and, similarly, the leading end of the web 14 is threaded under the roller 36 and threaded under the associated clamping bar 74 and over the associated surface 70 of segment 66 so as to project onto the exposed cutting surface 52. Furthermore, air is supplied to the various conduits 80 as indicated by the arrows 84 so as to keep the exposed end of the web in contact with the cutting surface 52. The carriage 86 now begins to move in the direction of the arrow 122, it being noted that the rollers 62 of the operating member 54 are in the path of movement of the forward projection 118. Furthermore, it will be understood that immediately prior to the engagement of the rollers 62 by said forward projection 118, the leading end 124 of the cutting die 116 engages the free end of the web 16 which projects beyond the associated clamping member 74 and is retained in position for such engagement on the exposed cutting surface 52. Consequently, as soon as the free end of the web 16 is engaged by the die end 124, the projection 118 engages the operating rollers 62 so as to pivot the operating member 54 counterclockwise viewing FIGURE 2 whereby the web 16 is advanced in the direction of the arrow 128 toward the cutting surface 52 in view of the fact that the web is engaged between the clamping bar 74 and the associated surface 70. However, it will be understood that the force or tension of the spring 78, while it is sufficient to clamp the web between the clamping bar and the underlying surface 70, is not sufficient to impede or prevent the withdrawal of the web thereunder or as a result of the movement of the cutting die 116 in the direction of the arrow 122. Consequently, it will be apparent that the withdrawn web passes onto the cutting surface 52 and is thereon subjected to the cutting action of the cutting dies 116. Furthermore, it will be understood that the cut pieces are drawn up against the dies due to the fact that the vacuum action operable through the valve 106 has been applied to the interior chamber 100 which is evacuated. Consequently, the cut pieces remain on the overlying portion of the cutting die 116 as the carriage 86 completes its operating movement or stroke to the left viewing FIGURE 1. When the carriage has passed completely beyond the automatic feed device 40, the limit switch 112 is engaged by the leading end of the carriage and operated thereby. The effect of the operation of the limit switch 112 is to discontinue the operation of the motor which is operating wheel 90 and also to operate the valve 106 so that the valve is now connected to the blower through the conduit 110 rather than being connected through conduit 108 to the vacuum creating device. The air entering the chamber 100 now forces the cut cloth pieces from the undersurfaces of the cutting dies 116 as shown in broken lines in FIGURE 7, the cut cloth pieces being identified by the reference numeral 130 so that each piece falls onto the stacked pile 20 of the similar shaped pieces. It will be understood that when the carriage 86 has moved sufficiently in the direction of the arrow 122 to release the rollers 62, the weight 64 will be operable to return the activating member 54 to the vertical position thereof as shown in FIGURE 1. The operation of the limit switch 112 was also effective to energize the motor for operating the conveyor wheel 92 whereupon the carriage 86 begins to move in the opposite direction thereof as shown by the arrow 132 in FIGURE 3. In the reverse operation of the carriage 86, the leading end 126 of the dies 116 engages the exposed end of the web 14 immediately prior to the engagement of the rollers 62 by the carriage projection 120 as shown in FIGURE 3. As a result thereof, and in the same manner as previously described in connection with the web 16, the web 14 is advanced and drawn along the exposed cutting surface 52 for cutting action by the cutting dies 116, the cut pieces adhering to the undersurfaces of the dies as a result of the vacuum action as shown, for example, by the arrow 134 in FIGURE 3. During said operation, the web 14 advances in the direction of arrow 136 as shown in said figure. Upon completion of the movement of the carriage 86 toward the right viewing FIGURE 1, during which of course the feed device 40 or more specifically the feed elements 66 and 68 thereof rotated clockwise, viewing FIGURE 3, in the direction of the arrow 138, the limit switch 114 is engaged so as to discontinue the operation of the motor which operates the conveyor wheel 92 and also to convert the valve 106 from a vacuum to a blower operation. Consequently, the piles of cut cloth receive the cut pieces 130. It will be noted that when the carriage 86 moves to the left, viewing FIGURE 1, the piles 20 form on table top 32 and when the carriage moves to the right the piles 20 form on table top 34. Operation of limit switch 114 in addition to discontinuing the operation of the motor for wheel 92 and operating valve 106 to connect with blower conduit 110, also energizes the motor for wheel 90 to begin movement of the carriage toward the left viewing FIGURE 1. As soon as the carriage disengages the limit switch 114, the latter is effective to operate valve 106 to connect it to the vacuum conduit 108 and the cycle is repeated.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. Apparatus of the character described comprising means for mounting first and second rolls of sheet material webs in spaced relation, oscillatable means for presenting the leading ends of said webs and operable between said rolls to alternately withdraw the sheet material therefrom in response to the oscillations thereof, a horizontally reciprocable carriage mounted for movement relative to said oscillatable means, said carriage having means to engage one of said leading ends during a first stroke thereof and the other of said leading ends during an opposite stroke thereof and having cutting means operable to alternately cut the sheet material webs during said strokes thereof, and means for oscillating said presenting means in response to said strokes of said carriage whereby to withdraw and cut the web from one roll during reciprocation of the carriage through said first stroke and to withdraw and cut the web from the other roll during reciprocation of the carriage through said opposite stroke.

2. Apparatus as in claim 1, said presenting means comprising a cylinder mounted for rotation in opposite directions, a first clamping means operable to releasably clamp one of said webs to present the leading end thereof on said cylinder, second clamping means operable to releasably clamp the other of said webs to present the leading end thereof on said cylinder, said clamping means being spaced circumferentially of said cylinder to position the leading web ends therebetween and being mounted for concomittant oscillation relative to the surface of said cylinder, and means for effecting the oscillation of said clamping means.

3. Apparatus as in claim 2, said clamping means being mounted for oscillation about the axis of rotation of said cylinder, and said means for effecting the oscillation of said clamping means being operatively connected thereto and mounted for oscillation about said axis.

4. Apparatus as in claim 3, said oscillation effecting means having one end portion extending into the path of movement of said carriage and an opposite end portion provided with a counterweight.

5. Apparatus as in claim 2, said cylinder having a counter-cutting surface and said clamping means having air blower means to blow the leading web ends against said surface.

6. Apparatus as in claim 3, said clamping means being U-shaped segments each having a bight overlying the cylinder surface and a clamping bar biased against the associated bight, the associated web being threaded between said bight and clamping bar.

7. Apparatus as in claim 1, said carriage having an air chamber, said cutting means being mounted below said air chamber, said air chamber having air passages above said cutting means and being provided with valve means alternately in operative communication with vacuum means and blower means.

8. Apparatus as in claim 7, and means to operate said valve means to connect the latter to said vacuum means during each reciprocation of said carriage whereby to draw the cut pieces upwardly against said cutting means and to connect said valve means to said blower means at the end of each reciprocation of said carriage whereby to blow the cut pieces from said cutting means onto stacked piles thereof.

9. Apparatus as in claim 8, and a pair of laterally spaced surfaces positioned to receive the pieces blown from said cutting means.

10. Apparatus for cutting pieces from sheet materials comprising, reciprocably movable carriage means operable through cutting strokes thereof and provided with a cutting die, a counter-cutting surface disposed relative to the path of movement of said cutting die and cooperating therewith to provide a cutting action, and means for presenting the leading ends of a pair of sheet material webs for engagement of one of said webs by said carriage means during a cutting stroke in a first direction of movement of said carriage means and for engagement of the other of said webs by said carriage means during a cutting stroke in the opposite direction of movement of said carriage means, said presenting means including means operable in response to each of said cutting strokes of said carriage for feeding the associated web from a supply thereof to said cutting surface.

11. Apparatus as in claim 10, said carriage means being provided with vacuum forming means for holding the cut pieces of said web in engagement with said carriage means whereby the cut pieces are released from said carriage means to fall onto stacked piles thereof upon discontinuance of the vacuum.

12. Apparatus as in claim 10, said last mentioned means comprising, means for clamping each web adjacent to the leading end thereof, mounting means for each of said clamping means, each mounting means being oscillatable in a rotary direction relative to said cutting surface, and means operable by said carriage during said first direction cutting stroke for operating one of said clamping means for feeding the associated web and during said opposite direction stroke for operating the other of said clamping means for feeding the other web.

13. Apparatus for cutting pieces from sheet materials comprising: reciprocably movable carriage means operable through cutting strokes thereof and provided with a cutting die, a counter-cutting surface disposed relative to the path of movement of said cutting die and cooperating therewith to provide a cutting action, and means for presenting the leading end of a sheet material web for engagement by said carriage means during each cutting stroke thereof, said presenting means including means operable in response to said cutting stroke of said carriage for feeding said web from a supply thereof to said cutting surface, said last mentioned means comprising, means for clamping the web adjacent to the leading end thereof, means mounting said clamping means for oscillatory rotary movement relative to said cutting surface, and means operable by said carriage during the cutting stroke thereof for rotating said clamping mounting means in a direction to withdraw the web from the supply thereof.

References Cited in the file of this patent

UNITED STATES PATENTS

| | | |
|---|---|---|
| 589,884 | Williams | Sept. 14, 1897 |
| 1,048,775 | Wilkinson | Dec. 31, 1912 |
| 2,088,686 | Blanchard | Aug. 3, 1937 |
| 2,157,536 | Halstead | May 9, 1939 |
| 2,549,202 | Idelman | Apr. 17, 1951 |
| 2,960,898 | Wheeler | Nov. 22, 1960 |